(12) United States Patent
Paila et al.

(10) Patent No.: US 7,296,071 B2
(45) Date of Patent: Nov. 13, 2007

(54) SERVICE TRANSMISSION IN A PACKET DATA NETWORK

(75) Inventors: Toni Paila, Degerby (FI); Kari Rissanen, Espoo (FI)

(73) Assignee: Nokia Corporation, Espoo (FI)

( * ) Notice: Subject to any disclaimer, the term of this patent is extended or adjusted under 35 U.S.C. 154(b) by 837 days.

(21) Appl. No.: 10/185,713

(22) Filed: Jul. 1, 2002

(65) Prior Publication Data

US 2003/0018800 A1    Jan. 23, 2003

Related U.S. Application Data

(63) Continuation of application No. PCT/FI00/01165, filed on Dec. 29, 2000.

(30) Foreign Application Priority Data

Dec. 31, 1999  (FI) ................................. 19992851

(51) Int. Cl.
  *G06F 15/173*  (2006.01)
(52) U.S. Cl. ................. 709/226; 709/203; 709/219; 455/450; 455/452.2; 455/464
(58) Field of Classification Search ............... 709/203, 709/219, 223–229, 231, 238, 239, 244; 455/452.2, 455/464, 450
  See application file for complete search history.

(56) References Cited

U.S. PATENT DOCUMENTS

| 4,744,028 | A |  | 5/1988 | Karmarkar |
| 5,257,369 | A |  | 10/1993 | Skeen et al. |
| 5,381,477 | A | * | 1/1995 | Beyers et al. ................ 380/231 |
| 5,673,430 | A | * | 9/1997 | Story .......................... 725/116 |
| 5,815,662 | A | * | 9/1998 | Ong ............................ 709/219 |
| 5,901,352 | A | * | 5/1999 | St-Pierre et al. .......... 455/426.1 |
| 6,006,251 | A | * | 12/1999 | Toyouchi et al. ............ 709/203 |

(Continued)

OTHER PUBLICATIONS

Almeroth et al., "Scalable Delivery of Web Pages Using Cyclif Best-Effort Multicast," INFOCOM '98, 17th Annual Joint Conference of the IEEE Computer and Communication Societies, Proceedings, IEEE, Mar. 29-Apr. 2, 1998, vol. 3, chapter 2, pp. 1214-1221.

(Continued)

*Primary Examiner*—Phuoc Nguyen
(74) *Attorney, Agent, or Firm*—Pillsbury Winthrop Shaw Pittman LLP; Larry J. Hume

(57) ABSTRACT

A method of transmitting a service to several subscribers in a packet data network capable of individual and group transmissions. The method includes collecting requests for the service from the several subscribers, evaluating the popularity of the service, forming a group of the subscribers that have requested the service, and transmitting the service over a group transmission if the popularity of the service at least equals or is likely to equal a predetermined threshold level. The mobile node subscribers may be reached via several different access networks, in which case an optimal access network can be selected. The method is preferably implemented by a group forming unit which can be integrated or co-located with a gateway which connects the service provider's network with the Internet.

20 Claims, 2 Drawing Sheets

U.S. PATENT DOCUMENTS

| | | | | |
|---|---|---|---|---|
| 6,128,279 | A * | 10/2000 | O'Neil et al. | 370/229 |
| 6,282,429 | B1 * | 8/2001 | Baiyor et al. | 455/512 |
| 6,324,184 | B1 * | 11/2001 | Hou et al. | 370/468 |
| 6,611,684 | B1 * | 8/2003 | Franks | 455/433 |
| 6,963,850 | B1 * | 11/2005 | Bezos et al. | 705/26 |
| 7,113,998 | B1 * | 9/2006 | Stern et al. | 709/231 |

OTHER PUBLICATIONS

Asaka et al., "Multifast Routing in Satellite-Terrestrial Networks," Communications, 1999, APCC/OECC '99, 5th Asia-Pacific Conference on . . . and 4th Optoelectronics and Communications Conference, Oct. 18-22, 1999, vol. 1, pp. 768-771.

Almeroth et al., "Using Satellite Links as Delivery Paths in the Multicast Backbone (MBone)," Proceedings of ACM/IEEE International Workshop on Satellite-Based Information Services*WOSBIS '98), Dallas, TX, Oct. 1998, chapter 5, pp. 47-54.

Shek et al., "Dynamic Multicast Information Dissemination in Hybrid Satellite-Wireless Networks," Proceedings of ACM International WOrkshop on Data Engineering for Wireless and Mobile Access (MobiDE), Seattle, WA, Aug. 1999, chapter 2, pp. 30-35.

* cited by examiner

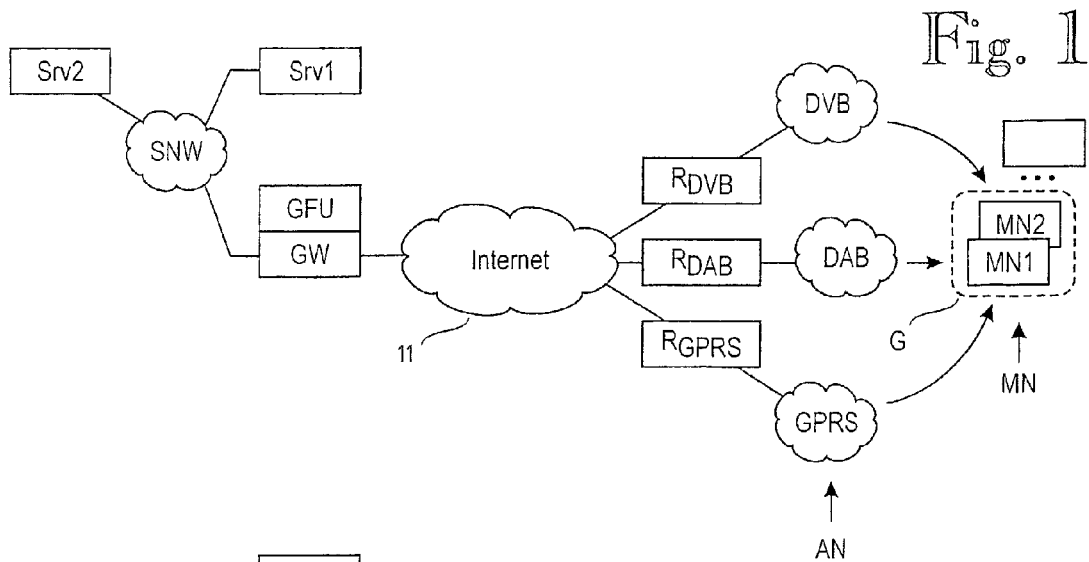
Fig. 1
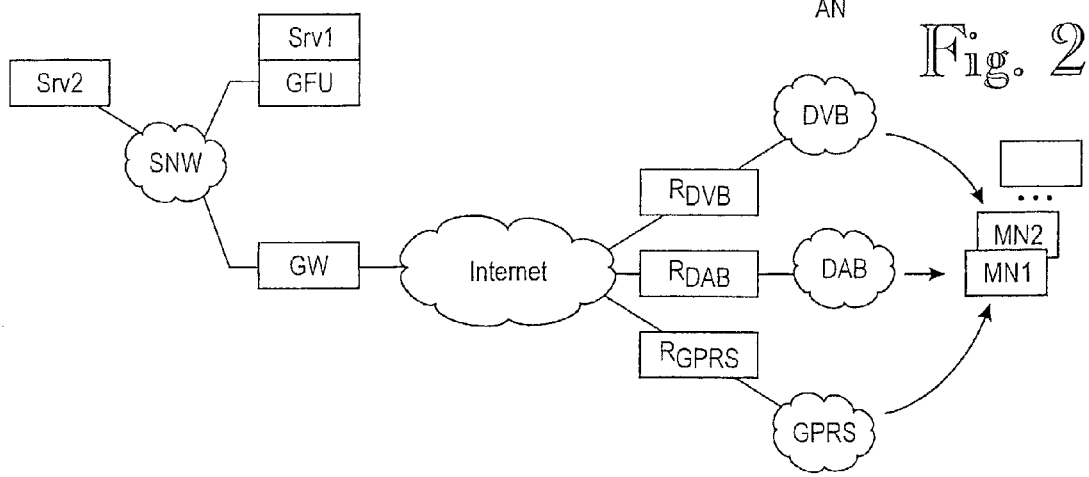
Fig. 2
Fig. 5
| | PR0 | | PR1 PR2 | | USP |
|---|---|---|---|---|---|
| Application | Delay | Application | Delay | Application | Delay |
| Entertainment video | 120 | Entertainment video | 600 | - | - |
| File download | 20 | File download | 1800 | File download | 10 |
| News/text | 2 | News/text | - | - | - |
| News/video | 20 | News/video | - | - | - |
| ... | | ... | | ... | |

SERVICE TRANSMISSION IN A PACKET DATA NETWORK

This is a Continuation of International Application No. PCT/FI00/01165, which was filed on Dec. 29, 2000 in the English language and designated the U.S.

BACKGROUND OF THE INVENTION

The invention relates to traffic management in a packet data network having group transmission capability. A transmission group can be formed, for example, by broadcasting or multicasting an encrypted transmission signal and by distributing decryption keys only to the intended recipients (the group members). The packet data network is used for conveying several services to several subscribers. Some services are more popular than others.

The invention is especially applicable to a multi-bearer packet data network. A multi-bearer network, or an MBN, is a network having the capability to carry a data packet via one of several alternative bearers. To be more precise, the term 'multi-bearer network' should be interpreted as meaning 'multi-bearer-type network', or in other words, a network arrangement which provides multiple, different bearer types for data packet delivery. An example of a suitable MBN is a so-called MEMO concept (Multimedia Environment for Mobiles), see reference 1. Additionally, the MBN supports mobility of a subscriber terminal. An example of terminal mobility is IP mobility, which is the topic of standard RFC2002 by the Internet Engineering Task Force (IETF). This RFC standard is incorporated herein by reference.

The problem underlying the invention is how to optimize the use of transmission resources. This problem is most significant in a packet radio network, because radio bandwidth is a limited natural resource. Broadcast systems based on orthogonal frequency division multiplexing modulation (OFDM) and on single frequency network (SFN) techniques are very efficient when the same signal is distributed to a large group of subscribers.

BRIEF SUMMARY OF THE INVENTION

Accordingly, it is an object of the present invention to provide a mechanism for improving the efficiency of a packet data network arrangement capable of individual and group transmissions when the network arrangement is used for transmitting a service to several subscribers. The object is achieved with the method and the equipment which are characterized by what is disclosed in the attached independent claims. Preferred embodiments of the invention are disclosed in the attached dependent claims.

The invention is based on the idea that the overall transmission efficiency of a packet data network can be improved by evaluating the popularity of the services offered by/via the network, and if the popularity exceeds a certain threshold value, the service is transmitted as a group transmission, and otherwise as one or more individual (point-to-point) transmissions. From this wording, it is apparent that 'individual' or 'point-to-point' transmission means that each data packet is dedicated to only one mobile node. 'Group transmission', as used herein, is a generic term for techniques in which data packets are intended to a group comprising two or more subscribers. Broadcasting and multicasting are common examples of group transmissions.

The seemingly simple idea of the invention involves several complexities. In other words, at first sight the invention appears to cause more problems than it solves. For instance, it is highly unlikely that a large enough group of subscribers will request a service simultaneously. This means that in practice, group formation will involve delays. Some applications and some subscribers tolerate longer delays than others. The subscribers should be able to indicate that they are willing to join a group if joining the group causes a certain maximum delay and/or allows a certain minimum price deduction over point-to-point transmission. According to a preferred embodiment of the invention, this problem (delays and price issued versus subscriber preferences) is solved by evaluating subscription profiles which indicate on what terms each mobile node subscriber is willing to suffer additional delays. The contents of the profiles differ between different application types. For example, a file download may, in some situations, tolerate delays up to several hours. In contrast, an investor may not be willing to wait more than a few seconds for an important piece of news. Thus, the network operator or server administrator may set up network-wide or server-wide default profiles which indicate the maximum allowable delay for each application type. The profiles may also differ between different subscribers. The subscriber-specific profiles override the network-wide or server-wide default profiles. Yet further, a subscriber should be able to indicate if a certain situation requires a deviation from the subscriber-specific profile (which in turn indicates a deviation from the network-wide or server-wide default profiles). Such a temporary deviation can be indicated by including a corresponding parameter in the actual service request.

The step of evaluating service popularity can be implemented simply by comparing the actual number of pending requests with a threshold level. The threshold level may be fixed or adaptive. An example of an adaptive threshold level is a case where the threshold level for forming a group in a broadcast network is increased as the load of that network increases. In addition to the actual number of pending requests, the history of the service popularity and/or the type of the service can be taken into account. For example, for some service types, a group can be formed for a single subscriber, and more subscribers can be added to the group later. An example of such a service is file download, if the download protocol allows the download to begin at an arbitrary position of the file. Another example is real-time video wherein the subscriber wants to see what is happening now, instead of requesting transmission from the beginning of the program. (Some video sources do not even have a 'beginning'. For example, ski resorts or golf courses may offer real-time video of the current weather conditions.) With such services, if the history shows that the service has been popular, a group may be formed although it initially consists of only one subscriber.

BRIEF DESCRIPTION OF THE SEVERAL VIEWS OF THE DRAWING

The method and the apparatus according to the invention will be described more in detail by means of preferred embodiments, with reference to the appended drawing in which:

FIG. 1 is a block diagram of a network arrangement in which the invention can be used and a group formation unit according to the invention;

FIG. 2 shows an alternative location for the group formation unit;

FIG. 5 illustrates the concept of service profile hierarchy.

DETAILED DESCRIPTION OF THE INVENTION

Figure 3:
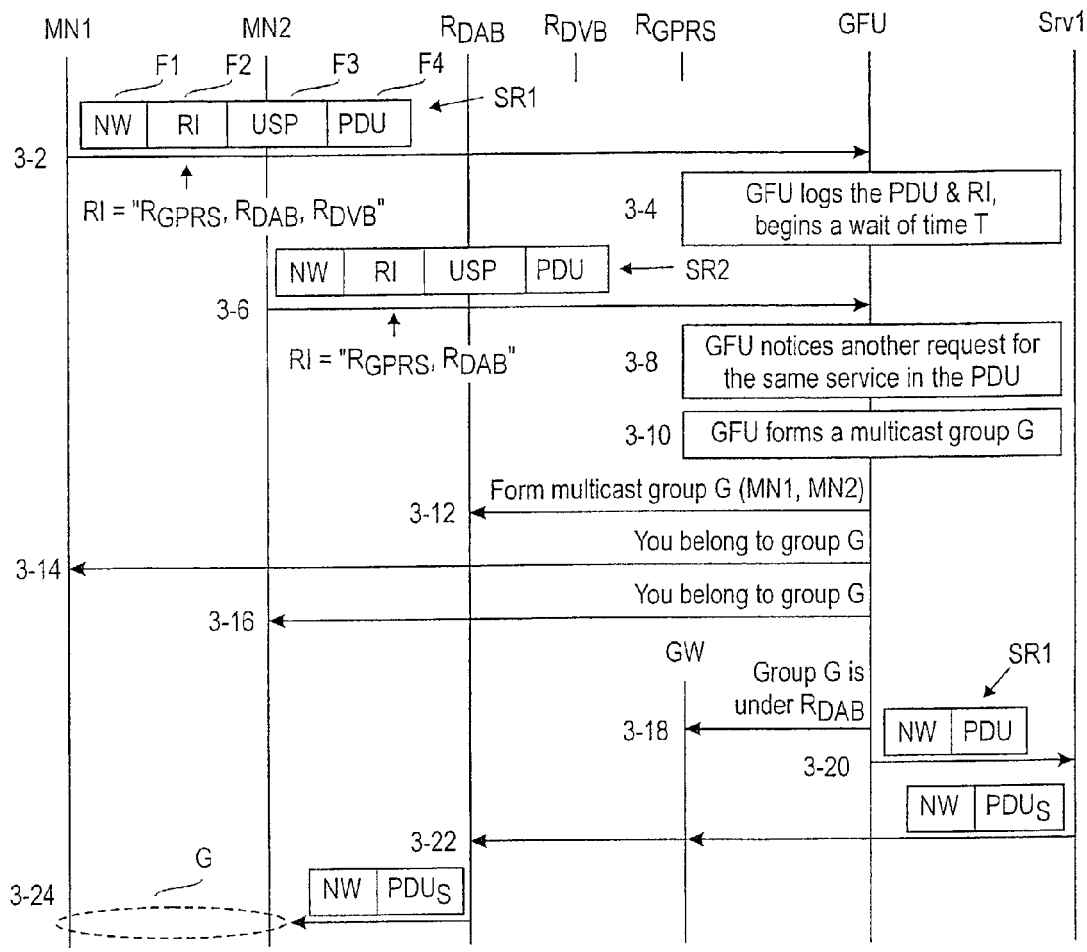
FIG. 3 shows a signalling diagram which relates to group forming.

FIG. 1 is a block diagram of a network arrangement in which the invention can be used. Mobile nodes MN1, MN2 request services from one or more servers Srv1, Srv2. The mobile nodes can access the services via several alternative access networks AN. In the example shown in FIG. 1, the access networks comprise digital video broadcasting (DVB), digital audio broadcasting (DAB) and general packet radio service (GPRS). Other typical access networks are high-speed GSM and wideband-CDMA (e.g. UMTS). In this example, the servers Srv1 and Srv2 are connected to a service network SNW, which may be a service provider's local area network, for example. The service network SNW is connected to the Internet via a gateway GW (and, typically, via a firewall which is not shown separately). The access networks are connected to the Internet via corresponding routers $R_{AN}$, where 'AN' is the abbreviation of the access network.

The invention is particularly useful in a network arrangement with multiple alternative access networks, as shown in FIG. 1. However, the invention is applicable to a network arrangement with only one access network, such as the GPRS network, as long as the access network is capable of individual (point-to-point) and group transmissions.

According to the hardware aspect of the invention, the service network SNW comprises or is operationally connected to a group formation unit GFU. The group formation unit GFU collects or monitors service requests from the mobile node subscribers. It evaluates the popularity of the service. If the popularity of the service equals or exceeds a predetermined threshold level, the GFU forms a group of the subscribers that have requested the service and transmits (or controls the transmission of) the service over a group transmission. If the popularity of the service fails to equal the predetermined threshold level, the GFU transmits (or allows/controls the transmission of) the service over a sufficient number of individual transmissions. In the example shown in FIG. 1, the group formation unit GFU is integrated or co-located with the gateway GW. In this case, if the criteria for group formation are met, the GFU requests the gateway GW to associate the group members with the group. It also requests the appropriate service-providing server Srv1 or Srv2 to send the service to the gateway GW such that the destination field of the data packets indicate this group as the recipient.

FIG. 2 shows a slightly modified example in which the group formation unit GFU is integrated or co-located with a service-providing server Srv1. In this case, if the criteria for group formation are met, the GFU/Srv1 combination applies source routing to the corresponding router of the appropriate access network. In other words, if subscribers in the DAB network generate enough service requests for a certain service in the server Srv1, the GFU/Srv1 combination directly transmits the service to the router $R_{DAB}$ which forwards the service as a group (e.g. multicast) transmission.

FIG. 3 shows a signalling diagram which relates to group forming. In step 3-2, mobile node MN1 sends a service request SR1 comprising (for the purposes of this example) four fields F1 to F4. The F1 field is a network layer header indicating the sender and the destination of the service request, and the encapsulation protocol used. The F2 field comprises available router information (RI). It indicates which routers (or access networks) can be used to deliver the requested service. The F3 field is, or indicates, a user service profile USP, which will be discussed in more detail later (see FIG. 5). The F4 field of the service request comprises the packet data units PDU which indicate which service is being requested, such as the delivery of a certain file or an audio stream. In the scenario shown in FIG. 3, it has been assumed that the service request SR1 from mobile node MN1 is the first pending request for a given service of server Srv1. The mobile node MN1 sends the service request SR1 to server Srv1 but the group formation unit GFU temporarily keeps the service request SR1 to itself. The service request SR1 indicates that MN1 can be accessed via routers $R_{GPRS}$ and $R_{DAB}$ and $R_{DVB}$.

In step 3-4, the group formation unit GFU logs the service request and the available router information RI, and starts a timer with a time-out period of T. In step 3-6, within the time-out period T, mobile node MN2 requests the same service by sending a service request SR2. The request SR2 differs from the request SR1 in that SR2 indicates MN2 as the sender and only $R_{GPRS}$ and $R_{DAB}$ as available routers. (The user service profiles USP may differ, but it does not matter for this scenario.) In step 3-8, the GFU notices another request for the same service. Let us further assume (for keeping FIG. 3 simple) that two is a sufficient number for forming a subscriber group. Thus in step 3-10, the GFU forms a multicast group G in its own memory. The group G uses router $R_{DAB}$ because the access network under this router offers the fastest transmission among access networks which are common to both group members MN1 and MN2. In step 3-12, because $R_{DAB}$ has been selected as the fastest common router, the GFU orders router $R_{DAB}$ to configure its routing tables such that a new group G consists of mobile nodes MN1 and MN2. In steps 3-14 and 3-16, the GFU informs MN1 and MN2, respectively, that they are members of the group G in the DAB network. The messages 3-14 and 3-16 include the necessary security-related data, such as the necessary decryption keys (if needed).

In step 3-18, when the group G is formed, the GFU requests the gateway router GW to associate the group G with router $R_{DAB}$. Next, in step 3-20, the GFU forwards a service request SR to the server Srv1. This service request naturally requests the service which was requested by both MN1 and MN2. In step 3-22, the server Srv1 responds by starting to send packet data units $PDU_S$ to the gateway GW, which forwards them to the router $R_{DAB}$. Finally, in step 3-24, the router $R_{DAB}$ transmits packet data units $PDU_S$ of the requested service as one group transmission to the group G.

Figure 4A:
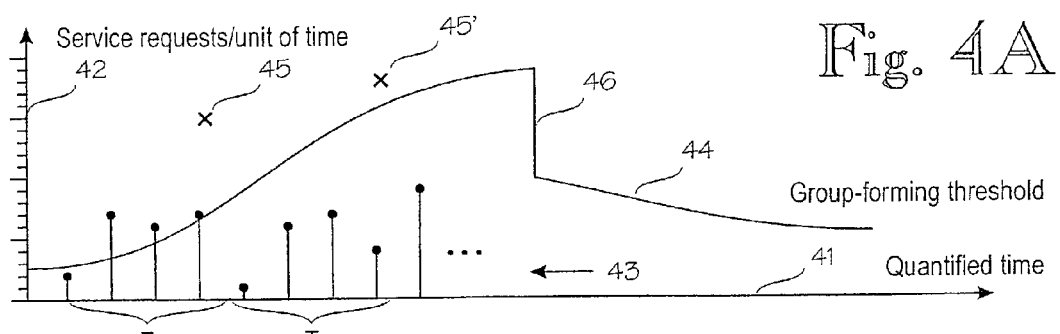
FIGS. 4A and 4B illustrates a decision-making process related to group forming.

FIG. 4A illustrates a decision-making process related to the formation of subscriber groups for group transmission. The horizontal axis 41 represents quantified time and the vertical axis 42 represents service requests per unit of time. This means that the group forming unit GFU counts the number of service requests for each service once per unit of time (such as one second). The vertical bars 43 represent the number of service requests during each unit of time. In this example, two subscribers requested a certain service during the first second, seven during the next second, etc. The curve 44 depicts the threshold level for forming a transmission group. When the first subscriber requests the service, the GFU starts a timer with a period of T. When the timer expires, the GFU notices that the cumulative number of requests, shown with reference number 45, is fifteen. This exceeds the threshold level 44, and the GFU forms a new subscriber group. Then the process is repeated, and reference number 45' depicts a second instant when the next group is formed, and so on.

In FIG. 4A, the threshold level 44 is not fixed but adaptive. The threshold level for forming a group in a broadcast network can be increased or decreased as the load of that network increases or decreases, respectively. In addition the threshold level may have an abrupt change 46 at certain points of time, such as after business hours.

Figure 4B:
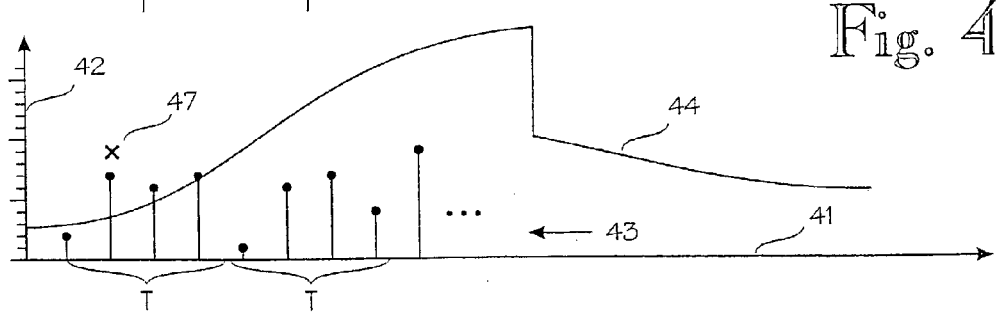

FIG. 4B shows a variation of the scenario shown in FIG. 4A. The difference between FIGS. 4A and 4B is that in the latter, the GFU knows that the service is of a type which allows new members to be added to an existing group. In this case, the GFU does not have to wait through the time window T before forming a group, and reference number 47 indicates a point of time where the cumulative number of subscribers (nine) exceeds the threshold level 44. In the earlier scenario, shown in FIG. 4A, the GFU could have formed the group at the instant depicted by reference number 47 (without waiting through the time window T), but it did not do so because it wanted to maximize the size of the broadcast group which could not be extended afterwards.

How does the GFU know which services or service types allow new members to be added to an existing group? The specification of Internet protocol version 6 (IPv6) defines optional headers which can be used to indicate such parameters. If IPv4 is used, a rule of thumb is that services using UDP (User Datagram Protocol) allow new members to be added to an existing group, whereas services using TCP (Transmission Control Protocol) do not.

FIG. 5 illustrates the concept of service profile hierarchy. The network operator or the GFU administrator can set up a network-wide or server-wide default service profile PR0 which indicates the maximum allowable delay (in seconds) for several application types, four of which are shown in FIG. 5. Subscriber-specific service profiles PR1, PR2, . . . , relate to the subscribers of the mobile nodes MN1, MN2, etc. In this example, the subscriber-specific service profile PR1 does not have an entry for news/text or news/video, which means that the subscriber is satisfied with the corresponding default values of the default profile PR0. However, this subscriber is willing to tolerate longer delays in the hope of obtaining lower transmission costs, as indicated by the long maximum delay times for entertainment video and file download. Let us further assume that FIG. 5 shows an extraordinary situation in which the subscriber cannot tolerate the half-hour delay indicated by the profile PR1, and the user service profile USP sent along with the service request SR1 (cf. step 3-2 and field F3 in FIG. 3) indicates a maximum delay of 10 seconds. Thus the logic for the GFU is to use the rightmost profile which has an entry for the application type in question.

Moreover, some services are possible only in certain access networks. For example, the GPRS network is not suitable for transmitting live video streams. Thus, the default service profile PR0 (or some other data structure) should indicate which access networks are capable of conveying the service in question.

The profiles PR0, PR1, PR2 and USP shown in FIG. 5 are very simplistic in that the only indicated parameter is the maximum allowable delay until the beginning of group transmission. In practice, the profiles can have many more parameters, such as maximum allowable price per minute and/or minimum price deduction which must be achieved in order to use group transmission. Thus, the network operator, or the service provider or the GFU administrator faces yet another problem: how to optimize group formation? If the threshold for group formation is low, and many groups are formed in the broadcast networks, the broadcast networks may run out of resources. There are at least two approaches to this problem, namely resource optimization and resource re-allocation.

Resource optimization means that the available resources (the transmission capability) are used in a manner which maximizes the operator's profits. A field of mathematics known as linear programming addresses the problems of resource optimization. Many linear programming algorithms are recursive, which means that the computation time increases according to the factorial of the number of resources. U.S. Pat. No. 4,744,028 to Narendra Karmarkar discloses a linear programming algorithm which is not recursive and which is especially suited to optimizing resources in a telecommunication system.

Resource re-allocation means that the resources available to the network operator(s) are not fixed. In other words, the network operator(s) may adjust the resources allocated to the various access networks. In practice this means that at least two different access networks are owned or administered by a single operator (or several operators in cooperation), and that the one or more operators are able to adjust the bandwidth allocated to the access networks as needed. If several operators are involved, one of them can sell surplus capacity to another. This obviously requires that if one access network surrenders a certain frequency band, another access network is able to utilize that band.

The description only illustrates preferred embodiments of the invention. The invention is not, however, limited to these examples but it may vary within the scope of the appended claims. For example, a group may be formed on the basis of an estimate (an educated guess) that the service will be popular. Thus, for example, news can be broadcast at a certain time without actually measuring the popularity of the service.

REFERENCE

1. MEMO network documentation at http://memo.lboro.ac.uk

The invention claimed is:

1. A method of transmitting a service to several subscribers in a packet data network capable of individual and group transmissions, wherein the service has a popularity which comprises a current value and a history, the method comprising:
   collecting requests for the service from the several subscribers via the packet data network,
   evaluating popularity of the requested service,
   forming a group of the subscribers that have requested the service,
   transmitting the requested service over a group transmission if at least one of the current value and the history of the popularity of the requested service at least equals a predetermined threshold level,
   transmitting the requested service over one or more individual transmissions if neither the current value nor the history of the popularity of the requested service equals the predetermined threshold level; and
   adjusting resources allocated to several different access networks based on service popularity of several services transmitted via the access networks, wherein said forming the group of the subscribers that have requested the service comprises evaluating a subscriber-specific indication of a maximum delay and/or minimum price deduction over individual transmission caused by the group transmission, and wherein said adjusting resources comprises at least one access network surrendering one or more resources and another access network utilizing one or more of the one or more surrendered resources.

2. A method according to claim 1, wherein the packet data network comprises or is connected to several different access networks, and transmitting the service over a group transmission comprises selecting an optimal access network.

3. A method according to claim 2, wherein the access networks comprise broadcast networks and networks with point-to-point transmission capability.

4. A method according to claim 1, wherein the group forming comprises evaluating a subscription profile for each subscriber that has requested the service.

5. A method according to claim 1, wherein the group forming comprises:
evaluating the type of the requested service, and
forming a group although the initial number of subscribers in that group does not equal the predetermined threshold level, if:
a) the type indicates that subscribers can be added to an existing group, and
b) the history of the popularity indicates that the popularity is likely to equal the predetermined threshold level.

6. A method according to claim 1, wherein the service comprises file download.

7. A method according to claim 1, wherein the predetermined threshold level is adaptive.

8. A method according to claim 1, wherein the predetermined threshold level is adaptive to a current load of the packet data network.

9. A method according to claim 1, wherein said subscriber-specific indication is determined based on a subscriber-specific subscription profile.

10. A method according to claim 1, wherein said subscriber-specific indication is determined based on a subscriber-specific request to a specific service.

11. A group forming unit for assisting transmission of a service from a server to several subscribers in a packet data network capable of individual and group transmissions, wherein the group forming unit is adapted to:
collect requests for the service from the several subscribers via the packet data network,
valuate popularity of the requested service wherein the service has a popularity which comprises a current value and a history,
form a group of the subscribers having requested the service, based on an evaluation of a subscriber-specific indication of a maximum delay and/or minimum price deduction over individual transmission caused by the group transmission,
configure transmission of the requested service over a group transmission if at least one of the current value and the history of the popularity of the requested service at least equals a predetermined threshold level, and otherwise over one or more individual transmissions, and to adjust resources allocated to several different access networks based on service popularity of several services transmitted via the access networks wherein said adjusting resources comprises at least one access network surrendering one or more resources and another access network utilizing one or more of the one or more surrendered resources.

12. A group forming unit according to claim 11, wherein the packet data network comprises or is connected to several different access networks, and group forming unit is adapted to select an optimal access network.

13. A group forming unit according to claim 12, wherein the group forming unit is integrated or co-located with a gateway connecting a first network, to which the server is connected and a second network which is common to the access networks.

14. A group forming unit according to claim 12, wherein the group forming unit is integrated or co-located with the server which provides the requested service.

15. A group forming unit according to claim 11, wherein the group forming unit comprises:
means for evaluating a type of the requested service to check if subscribers can be added to an existing group, and
means for forming the group although the initial number of subscribers in that group does not equal the predetermined threshold level, if:
a) the type indicates that subscribers can be added to an existing group, and
b) the history of the popularity indicates that the popularity is likely to equal the predetermined threshold level.

16. A group forming unit according to claim 11, wherein the service comprises file download.

17. A group forming unit according to claim 11, wherein the predetermined threshold level is adaptive.

18. A group forming unit according to claim 11, wherein the predetermined threshold level is adaptive to a current load of the packet data network.

19. A method of transmitting a service to several subscribers in a packet data network that comprises or is connected to several different access networks and is capable of individual and group transmissions, the method comprising:
collecting requests for the service from the several subscribers via the packet data network,
evaluating popularity of the requested service wherein the service has a popularity which comprises a current value and a history,
selecting an optimal access network,
transmitting the requested service over one or more individual transmissions if neither the current value nor the history of the popularity of the requested service equals the predetermined threshold level,
forming a group of the subscribers that have requested the service, and transmitting the requested service over a group transmission if at least one of the current value and the history of the popularity of the requested service at least equals a predetermined threshold level, and
adjusting resources allocated to the several different access networks on the basis of service popularity of several services transmitted via the access networks; wherein said adjusting resources comprises at least one access network surrendering one or more resources and another access network utilizing one or more of the one or more surrendered resources.

20. A method of transmitting a service to several subscribers in a packet data network capable of individual and group transmissions, the method comprising:
collecting requests for the service from the several subscribers via the packet data network,
evaluating popularity of the requested service, wherein service popularity comprises a current value and a history of the service popularity, transmitting the requested service over one or more individual transmissions if neither the current value nor the history of the popularity of the requested service equals the predetermined threshold level, forming a group of the subscribers that have requested the service, transmitting the requested service over a group transmission if at least one of the current value and the history of the popularity of the requested service at least equals a predetermined threshold level, and adjusting resources allocated to the several different access networks on the basis of service popularity of several services transmitted via the access networks, wherein the group forming comprises:

evaluating a type of the requested service to check if subscribers can be added to an existing group, and forming the group although the initial number of subscribers in that group does not equal the predetermined threshold level, if:

a) the type indicates that subscribers can be added to an existing group, and b) the history of the popularity indicates that the popularity is likely to equal the predetermined threshold level, and wherein the adjusting resources comprises at least one access network surrendering one or more resources and another access network utilizing one or more of the one or more surrendered resources.

* * * * *